United States Patent
Deinzer et al.

(10) Patent No.: US 7,949,165 B2
(45) Date of Patent: May 24, 2011

(54) METHOD FOR DETERMINING A TEMPORAL PROFILE OF A PROBABILITY DISTRIBUTION WITH LOCAL THREE-DIMENSIONAL RESOLUTION FOR THE PRESENCE OF A SUBSTANCE IN A VASCULAR SYSTEM

(75) Inventors: Frank Deinzer, Röthenbach (DE); Esther-Sabrina Platzer, Urmitz (DE)

(73) Assignee: Siemens Aktiengesellschaft, Munich (DE)

( * ) Notice: Subject to any disclaimer, the term of this patent is extended or adjusted under 35 U.S.C. 154(b) by 666 days.

(21) Appl. No.: 12/079,609

(22) Filed: Mar. 27, 2008

(65) Prior Publication Data
US 2008/0243435 A1 Oct. 2, 2008

(30) Foreign Application Priority Data
Mar. 27, 2007 (DE) .................. 10 2007 015 306

(51) Int. Cl.
*G06K 9/00* (2006.01)
*A61B 6/00* (2006.01)
*A61B 5/02* (2006.01)
*G06F 17/18* (2006.01)

(52) U.S. Cl. ............. 382/128; 378/4; 600/481; 702/181

(58) Field of Classification Search .................. 382/128, 382/129, 130, 131, 132, 133, 134; 378/4, 378/21–27, 98.11, 901; 600/324, 407, 462, 600/476, 479, 481, 483, 513; 128/920, 922
See application file for complete search history.

(56) References Cited

U.S. PATENT DOCUMENTS
4,458,267 A * 7/1984 Dolazza .................. 378/98.7
7,610,082 B2 * 10/2009 Chance .................... 600/475

FOREIGN PATENT DOCUMENTS
DE    10 2004 018 499 A1    6/2005

OTHER PUBLICATIONS

H. Schmitt, M. Grass, V. Rasche, O. Schramm, S. Haehnel, K. Sartor; "An X-Ray-Based Method for the Determination of the Contrast Agent Propagation in 3-D Vessel Structures", IEEE Transactions on Medical Imaging, Mar. 2002; pp. 251-262, vol. 21, No. 3, Magazine.

(Continued)

*Primary Examiner* — Abolfazl Tabatabai (57) ABSTRACT

The invention relates to a method for determining a probability distribution with local three-dimensional resolution for a substance in a vascular system. An acquisition time is assigned to a group of x-ray images showing a presence distribution with local 2D resolution for a substance in the vascular system at the acquisition time. A first preliminary presence probability distribution is determined using the x-ray images assigned to the acquisition time and a volume data set of the vascular system. A second preliminary presence probability distribution is determined using the presence probability distribution for the preceding acquisition time and a migration probability distribution with the substance migrating from first vascular locations to second vascular locations. A high individual probability to vascular locations is assigned if both preliminary presence probability distributions have a high probability value for the respective vascular location. Otherwise a lower and greater than zero individual probability is assigned.

15 Claims, 6 Drawing Sheets

OTHER PUBLICATIONS

H. Schmitt, M. Grass, R. Suurmond, T. Köhler, V. Rasche, S. Hähnel, S. Heiland, Reconstruction of blood propagation in three-dimensional rotational X-ray angiography (3D-RA), Computerized Medical Imaging and Graphics, Oct. 2005, pp. 507-520, vol. 29(7), Epub Sep. 2, 2005.

A. Doucet, N. De Freitas, N. Gordon, "Sequential Monte Carlo Methods in Practice", 2001, Springer-Verlag, Book.

M. Sanjeev Arulampalam, Simon Maskell, Neil J. Gordon, Tim Clapp, "A Tutorial on Particle filters for On-line Nonlinear/Non-Gaussian Bayesian Tracking", IEEE Transactions on Signal Processing, 2002, pp. 174-188, vol. 50, No. 2.

T. P. L. Roberts, A. Martin, R. L. Arenson, W. P. Dillon and C. B. Higgins, "Integrating X-ray angiography and MRI for endovascular interventions", Medica Mundi 44/3 Nov. 2000, pp. 2-9.

Hackjoon Shim, Dongjin Kwon, Il Dong Yun, Sang Uk Lee, "Robust segmentation of cerebral arterial segments by a sequential Monte Carlo method: Particle filtering", Computer Methods and Programs in Biomedicine 84(2-3), 2006, pp. 135-145.

Charles Florin, James Williams, Ali Khamene, Nikos Paragios, "Registration of 3D Angiographic and X-Ray Images Using Sequential Monte Carlo Sampling", Computer Vision for Biomedical Image Applications (CVBIA) 2005: 427-436.

* cited by examiner

METHOD FOR DETERMINING A TEMPORAL PROFILE OF A PROBABILITY DISTRIBUTION WITH LOCAL THREE-DIMENSIONAL RESOLUTION FOR THE PRESENCE OF A SUBSTANCE IN A VASCULAR SYSTEM

CROSS REFERENCE TO RELATED APPLICATIONS

This application claims priority of German application No. 10 2007 015 306.8 filed Mar. 27, 2007, which is incorporated by reference herein in its entirety.

FIELD OF THE INVENTION

The present invention relates to a method for determining a temporal profile of a probability distribution with local three-dimensional resolution for a substance in a vascular system,
wherein a volume data set and a temporal sequence of groups of x-ray images are predetermined for a computer,
wherein the volume data set describes the vascular system with local three-dimensional resolution, an acquisition time is assigned to each group of x-ray images, each group comprises at least one x-ray image and each x-ray image represents a presence distribution with local two-dimensional resolution for the substance in the vascular system present at the respective acquisition time.

BACKGROUND OF THE INVENTION

Diagnosis of vascular diseases using three-dimensional imaging requires visualization of the blood flow through the corresponding vessels. Treatment generally takes place with minimal invasion using catheters, which are inserted into the corresponding blood vessel. In order to be able to plan a minimally invasive intervention as precisely as possible and in particular to be able to carry it out exactly, the physician requires information about the position and spread of the vessels (location information) as well as the most accurate information possible about the blood flow through the corresponding vessel (temporal information). While aneurysms generally show up very clearly in the corresponding images, stenoses are generally relatively difficult to see. Instead the angiograms show points in the vessels where the through-flow of blood is much reduced. If stenosis leads to the complete occlusion of a vessel, this means that the corresponding vessel and all the vessels supplied by it are no longer identifiable in the x-ray recording. The three-dimensional visualization of the blood flow therefore provides the physician with important information about the degree of constriction or widening of a vessel and any possible effect on other vessels.

In a clinical situation the diagnosis of vascular diseases is currently based on temporal two-dimensional angiography sequences (showing the blood flow) or static three-dimensional data sets, which generally show a completely filled vessel tree.

The two-dimensional angiography sequences are generated from a view with constant C-arm alignment as a contrast agent is briefly injected. The angiography sequences show the temporal propagation of the contrast agent through the required vessels. Generally a reference image without contrast agent is acquired at the start of the sequence and this is subtracted from all subsequent recordings in the sequence, in order to see only the part of the vessel tree filled with contrast agent in the images. The method is also known as digital subtraction angiography (DSA). However the two-dimensional angiography sequences only supply information with local two-dimensional resolution, not information with spatial (=local three-dimensional) resolution.

DE 10 2004 018 499 A1 discloses a determination method of the type described above. With this method the computer determines a corresponding presence distribution with local three-dimensional resolution in temporally ascending order at least for some of the acquisition times. The presence distribution is related to the volume data set. With the exception of the temporally first acquisition time the computer uses the group of x-ray images assigned to the respective acquisition time and the volume data set to determine a first preliminary presence distribution, the computer uses the presence distribution determined for the preceding acquisition time and a vascular structure of the vascular system to determine a second preliminary presence distribution and assigns the presence of the substance respectively to locations in the volume data set, which are components of the vascular system (vascular locations), if both the first and second preliminary presence distributions indicate the presence of the substance for the respective vascular location and otherwise assigns non-presence of the substance.

In other words: with the procedure according to the prior art vascular locations are excluded, if they are not classified as "substance present" according to both presence distributions.

The procedure according to the prior art already has significant advantages compared with the locally purely two-dimensional processing of the angiography sequence. For it is possible in some instances to map the blood flow from the two-dimensional to the three-dimensional. The procedure according to the prior art also has disadvantages however. In particular the "hard" exclusion of vascular locations means that errors in individual x-ray images of the angiography sequence can no longer be corrected during automated evaluation of the angiography sequence, even if they can be identified as errors based on further x-ray images.

A similar disclosure can be taken from the technical article "Integrating X-ray angiography and MRI for endovascular interventions" by T. P. L. Roberts et al., Netherlands, Philips Medical Systems, November 2000, MEDICA MUNDI, vol. 44/3, pages 2 to 9, ISSN 0025-7664.

From the technical article "Robust segmentation of cerebral arterial segments by a sequential Monte Carlo method: Particle filtering" by H. Shim et al., Elsevier 2006, Computer Methods and Programs in Biomedicine, vol. 84 (2006), pages 135 to 145 it is known that probability distributions based on particle filters can be used when segmenting vessels.

From the technical article "Registration of 3D Angiographic and X-Ray Images Using Sequential Monte Carlo Sampling" by C. Florin et al., Springer-Verlag 2005, Computer Vision for Biomedical Image Applications, Lecture Notes in Computer Science, vol. 3765, pages 427 to 436, ISSN 0302-9743, it is known that probability distributions based on particle filters can be used during 2D to 3D registration.

SUMMARY OF THE INVENTION

The object of the present invention is to create possibilities which allow an automated evaluation of angiography sequences with a high level of quality.

The object is achieved by the features of the claims.

According to the invention the computer determines a corresponding presence probability distribution respectively in temporally ascending order at least for some of the acquisition times. The present probability distributions are related to the volume data set. With the exception of the temporally first acquisition time the computer uses the group of x-ray images assigned to the respective acquisition time and the volume data set to determine a first preliminary presence probability distribution, the computer uses the presence probability distribution determined for the preceding acquisition time and a migration probability distribution, with which the substance migrates to second vascular locations by the respective acquisition time, if it is at a first vascular location in the volume data set at the preceding acquisition time, to determine a second preliminary presence probability distribution and assigns a high individual probability respectively to the vascular locations, if both the first and second preliminary presence probability distributions for the respective vascular location have a high probability value, and otherwise assigns a lower individual probability, which is however greater than zero, to the respective vascular location.

In the simplest instance the computer determines the respective presence probability distribution by multiplying the first and second preliminary presence probability distributions. Since the individual probabilities are greater than zero, even if the first and second preliminary presence probability distributions do not have the high probability value for the respective vascular location, this procedure implies among other things that the preliminary probability distributions also have high and lower values, with the lower values also being greater than zero.

To determine the first preliminary presence probability distribution it is possible for the computer to determine locations, which correspond to the presence of the substance in the vascular system (substance locations) in each of the x-ray images of the respective group, to determine a projection line respectively in the volume data set for each substance location of each of the x-ray images of the respective group, said projection line being mapped onto the respective substance location, to determine the nearest of the projection lines and the distance between this projection line and the respective vascular location for each vascular location and each of the x-ray images of the respective group respectively and as a function of the distances between the respective projection lines and the respective vascular location, to determine a first preliminary individual probability for the respective vascular location that the substance is present at this vascular location and to assign the respective first preliminary individual probability to the respective vascular location.

Alternatively it is possible for the computer, to determine the first preliminary presence probability distribution, to determine the substance locations in each of the x-ray images of the respective group, to determine a mapping location respectively for the vascular locations for each x-ray image of the respective group, onto which mapping location the respective vascular location is mapped in the respective x-ray image, as a function of the distances between the mapping locations and the nearest of the substance locations in the respective x-ray image to determine a first preliminary individual probability for the respective vascular location that the substance is present at this vascular location and to assign the respective first preliminary individual probability to the respective vascular location.

In both instances the computer sets the first preliminary individual probability to be assigned to the respective vascular location at a value above an upper limit probability, if the greatest of the distances determined for this vascular location is below a maximum distance. Otherwise the computer sets the first preliminary individual probability to be assigned to the respective vascular location at a value, which is between a lower limit probability and the upper limit probability. The lower limit probability is hereby greater than zero.

If the groups of x-ray images respectively have more than one x-ray image, the computer assigns one image probability respectively to the vascular locations preferably for each image considered. The first preliminary individual probability to be assigned to the respective vascular location can in this instance be determined based on the image probabilities, for example as a product of the image probabilities.

It is possible for the computer to receive criteria from a user, which the computer can use to determine the first and second presence probability distributions for a given volume data set and a given time sequence of groups of x-ray images. Alternatively these criteria can be permanently predetermined for the computer.

It is possible for the computer to determine the presence probability distribution for the temporal first acquisition time in the same manner as for the other acquisition times. In this instance a uniform distribution must be used as the presence probability distribution for the in reality non-existent temporally preceding acquisition time. However the computer preferably—because it is simpler—determines the corresponding presence probability distribution for the temporally first acquisition time based on the group of x-ray images assigned to the temporally first acquisition time and the volume data set. In particular the corresponding presence probability distribution can be determined for the temporally first acquisition time in the same manner as the first preliminary presence probability distribution is determined for the other acquisition times.

In one preferred embodiment the computer determines the presence probability distributions and the migration probability distribution using at least one particle filter. This procedure has a significantly smaller computation outlay compared with other procedures.

In one preferred embodiment of the present invention when determining the presence probability distributions the computer checks whether an abort criterion has been met. If the abort criterion occurs, based on the last determined presence probability distribution, the computer replaces the presence probability distributions assigned to the temporally preceding acquisition times in temporally descending order one after the other, with a respective first changed presence probability distribution. The computer undertakes these replacements until it has replaced the presence probability distribution assigned to the temporally first acquisition time. The computer determines the first changed presence probability distribution for the respective acquisition time based on the first preliminary presence probability distribution assigned to the respective acquisition time, the presence probability distribution currently assigned to the temporally next acquisition time (in some instances already first replaced) and an inverse back-migration probability distribution to the migration probability distribution. With this procedure calculation is carried out in a so to speak backward manner from the acquisition time, when the abort criterion was met, with the start of backward calculation however being based on the presence probability distribution determined when the abort criterion occurred.

It is particularly advantageous, if after replacing the presence probability distribution assigned to the temporally first acquisition time, the computer replaces the presence probability distributions assigned to the temporally next acquisition times in temporally ascending order one after the other starting from the presence probability distribution assigned to the temporally first acquisition time with a respective last changed presence probability distribution. The computer carries out this procedure until it has replaced the presence probability distribution, which was assigned to the acquisition time, when the abort criterion was met. The computer determines the last changed presence probability distribution for the respective acquisition time based on the first preliminary presence probability distribution assigned to the respective acquisition time, the presence probability distribution currently assigned to the temporally preceding acquisition time and the migration probability distribution. Calculation thus takes place in a forward direction again starting from the first replaced presence probability distribution for the temporally first acquisition time.

In the simplest instance the abort criterion consists in that the computer has determined the corresponding presence probability distribution for the temporally last acquisition time. Alternatively however it is also possible for the abort criterion to consist in that all the ambiguities resulting from the fact that the groups of x-ray images contain less location information than the volume data set are resolved with adequate certainty.

In the event that the presence probability distribution, with which the abort criterion is met, is not assigned to the temporally last acquisition time, the computer preferably determines, from the acquisition time following the acquisition time when the abort criterion was met to the temporally last acquisition time, in temporally ascending order one after the other, the presence probability distributions for the remaining acquisition times based on the first preliminary presence probability distribution assigned to the respective acquisition time, the presence probability distribution last assigned to the preceding acquisition time and the migration probability distribution. This procedure can take place in a similar manner to the first determination of the presence probability distributions.

BRIEF DESCRIPTION OF THE DRAWINGS

Further advantages and details will emerge from the description which follows of exemplary embodiments in conjunction with the drawings, in which essentially.

DETAILED DESCRIPTION OF THE INVENTION

Figure 1:
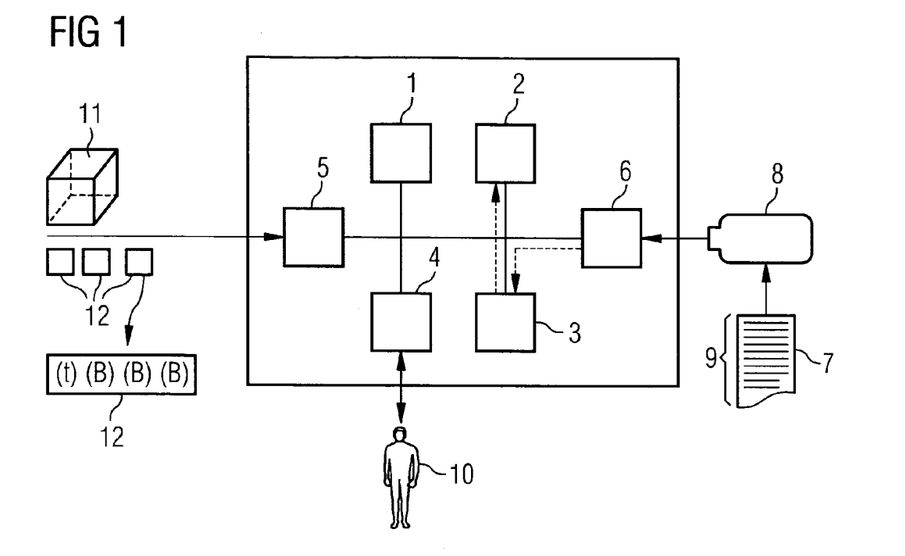
FIG. 1 shows a schematic diagram of the structure of a processing arrangement.

In FIG. 1 a computer has standard components 1 to 6. In particular the computer has a microprocessor 1, a main memory (RAM) 2, a mass storage device 3 (for example a hard disk), a user interface 4, a data interface 5 and a programming interface 6. The components 2 to 6 are configured in the usual manner and interact with each other in the usual manner. Thus for example the user interface 4 can comprise standard input and output facilities, such as a keyboard, mouse, display unit, etc. The data interface 5 can be an internet or LAN interface or a USB interface for example. An embodiment as a drive for a removable medium (for example a CD-ROM or DVD) is also possible. Similar embodiments are possible for the programming interface 6. In some instances the data interface 5 and programming interface 6 can be combined to form a common interface.

A computer program 7 is supplied to the computer by way of the programming interface 6. For example a data medium 8, on which the computer program 7 is stored in machine-readable form, can be connected to the computer. The computer program 7 is then read from the data medium 8 and copied to the mass storage device 3 of the computer and similarly stored there.

The computer program 7 contains machine code 9, in other words program instructions, which can be executed directly and immediately by the computer. The computer program 7 can be called up by a user 10 using standard input commands (for example a double mouse click). When the computer program 7 is called up, it is loaded into the main memory 2 of the computer and executed by the computer. Execution of the computer program 7 by the computer causes the computer to execute a determination method, which is described in detail below in conjunction with the further figures.

Figure 3:
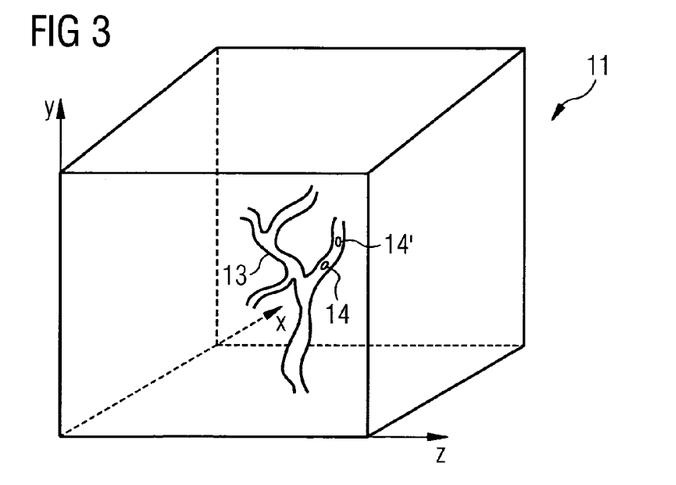
FIG. 3 shows a volume data set.
Figure 4:
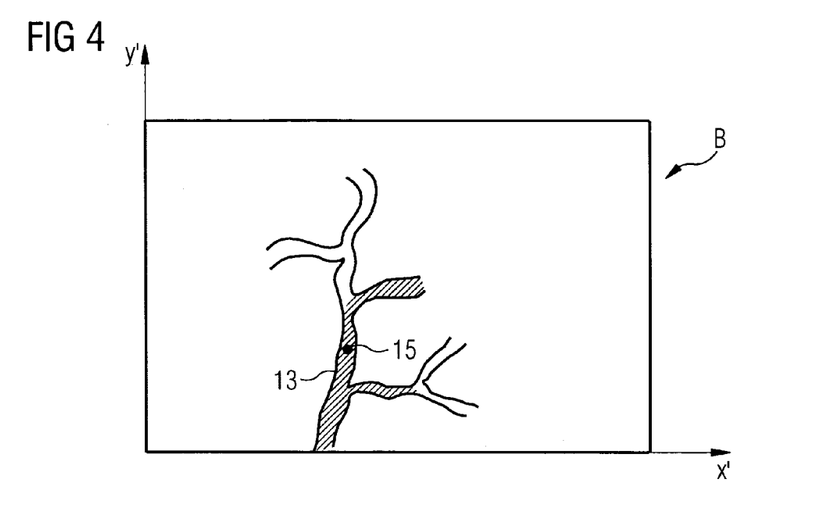
FIG. 4 shows an x-ray image.

The basic principle of the present invention is first described below in conjunction with FIGS. 2 to 4. Embodiments of the basic principle are then set out in conjunction with FIGS. 5 to 9.

Figure 2:
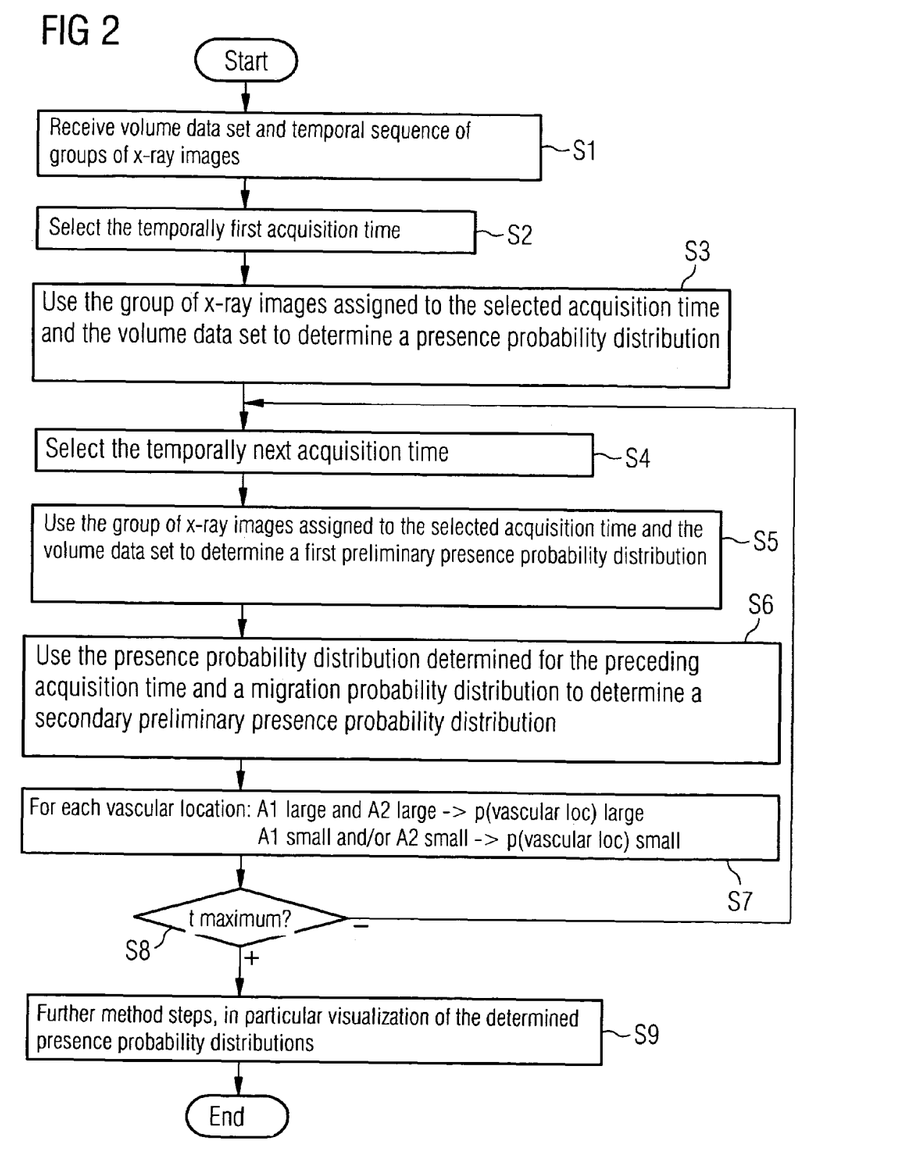
FIG. 2 shows a flow diagram.

According to FIG. 2 in a step S1 the computer first receives a volume data set 11 and a temporal sequence of groups 12 of x-ray images B. According to FIG. 3 the volume data set 11 has three spatial coordinates x, y, z and therefore has local three-dimensional resolution. It describes a vascular system 13. In particular the volume data set 11 can be present as a binary volume data set 11. In this instance a binary value "ONE" is assigned to each location (x, y, z) in the volume data set 11, which is a component of the vascular system 13, with the value "ZERO" being assigned to the other locations (x, y, z) of the volume data set 11. The locations of the volume data set 11, which are components of the vascular system 13, are hereafter referred to as vascular locations 14 (sometimes also 14').

According to FIG. 1 each group 12 of x-ray images B comprises at least one x-ray image B. According to FIG. 1 the groups 12 can however alternatively also comprise a number of x-ray images B. The x-ray images B can be native images. They are however preferably DSA images (DSA=digital subtraction angiography). According to FIG. 4 each x-ray image B of each group 12 is defined using two surface coordinates x', y', thus having local two-dimensional resolution. It represents a presence distribution of a substance (in the case of native images for example blood with or without contrast agent, in the case of DSA images blood with contrast agent) in the vascular system 13.

Each group 12 is also assigned an acquisition time t, when the x-ray images B of the respective group 12 were acquired. The groups 12 of x-ray images B are generally acquired with temporal equidistance. However this is not mandatory. Each x-ray image B of each group 12 is related to the acquisition time t of the respective group 12.

The sequence of the groups 12 of x-ray images B represents a temporal profile of a presence distribution with two-dimensional resolution for the substance in the vascular system 13. The temporal profile of the presence distribution should be mapped correctly into the three-dimensional space (more precisely into the volume data set 11) despite the fact that the groups 12 of x-ray images B only contain reduced location information compared with the volume data set 11. Thus a temporal profile of a presence distribution with local three-dimensional resolution for the substance in the vascular system 13 should be determined. The determination of this temporal profile is the subject matter of the present invention.

In a step S2 the computer selects the temporally first acquisition time t. For this (temporally first) acquisition time t in a step S3 the computer uses the group 12 of x-ray images B assigned to the temporally first acquisition time t and the volume data set 11 to determine a corresponding presence probability distribution A. It is standardized to one. The presence probability distribution A in step S3 is generally determined in the same manner as a first preliminary presence probability distribution A1, which is determined in a step S5 for the other acquisition times t.

In a step S4 the computer selects the temporally next acquisition time t. In a step S5 the computer determines a first preliminary presence probability distribution A1 for the acquisition time t now selected. The first preliminary presence probability distribution A1 is determined exclusively using group 12 of x-ray images B assigned to the selected acquisition time t and the volume data set 11. Temporal information (in other words about the flow pattern of the substance determined to date for example) is not included in step S5.

The computer thus determines a first preliminary individual probability p1 (14, 12) for each vascular location 14. p1 here corresponds to the respective individual probability itself. The reference character 14 stands for the respectively considered vascular location, 12 stands for the group of x-ray images B assigned to the respective acquisition time t. The integral of the first preliminary individual probabilities p1 over all the vascular locations 14 is standardized to one. Possible embodiments of step S5 will be examined in more detail below.

Then in a step S6 the computer determines a second preliminary presence probability distribution A2 for the selected acquisition time t. The second preliminary presence probability distribution A2 is also preferably standardized to one. The second preliminary presence probability distribution A2 is determined using the presence probability distribution A, which was determined for the temporally (immediately) preceding acquisition time t, and a migration probability distribution w. The migration probability distribution w indicates the probability with which the substance will migrate to second vascular locations 14 by the selected acquisition time t, if it is present at a first vascular location 14' at the preceding acquisition time t. Thus the computer determines a second preliminary individual probability p2 for each vascular location 14 according to the formula $$p2(14)=\int w(14,14') \cdot p(14')dV' \quad (1)$$

p2 here corresponds respectively to a preliminary second individual probability. w(14,14') corresponds to the migration probability that the substance, if it is present at the first vascular location 14' at the preceding acquisition time t, will migrate to the second vascular location 14 during the time period from the preceding acquisition time t to the currently selected acquisition time t. The first vascular locations 14' are given apostrophes here, so that they can be differentiated—purely formally—in the above formula from the second vascular locations 14. The migration probability w draws in particular on the structure of the vascular system 13 with local three-dimensional resolution, the estimated speed range, at which the substance flows at the respective first vascular location 14' and the time period from the previous acquisition time to the selected acquisition time t. p corresponds to the individual probabilities of the temporally preceding presence probability distribution A. Integration is carried out over the first vascular locations 14'.

Determination of the structuring of the vascular system 13 and determination of the speed, at which the substance flows, are known to those skilled in the art and as such are not the subject matter of the present invention. The individual migration probabilities w(14,14') are however defined so that the equation $$\int w(14,14')dV=1 \quad (2)$$

applies. In other words: If the substance was present at the vascular location 14' at the preceding acquisition time t, it can have neither increased nor disappeared. It must have migrated to some other vascular location 14. The differential "dV", which is different compared with equation 1, is intended to indicate here that in equation 2 integration is carried out over the vascular locations 14, while the vascular location 14' is kept constant.

The difference between immediately succeeding acquisition times t is generally constant. In this instance the migration probability distribution w is the same for all acquisition times t. Otherwise it has to be determined individually for the respective acquisition time t.

In a step S7 the computer determines the respective presence probability distribution A for the selected acquisition time t. The computer hereby assigns a high individual probability p to vascular locations 14, if both the first and second preliminary presence probability distributions A1, A2 for the respective vascular location 14 have a high preliminary individual probability value p1, p2. Otherwise it assigns a lower individual probability p to the respective vascular location 14. The lower individual probability p is however also greater than zero.

In the simplest instance the computer determines the respective presence probability distribution A by multiplying the first preliminary presence probability distribution A1 and the second preliminary presence probability distribution A2 together. It thus determines the corresponding individual probability p for each vascular location 14 according to the equation $$p(14)=p1(14) \cdot p2(14), \quad (3)$$

where p1 and p2 are the preliminary individual possibilities defined for the respective vascular location 14 according to the first and second preliminary presence probability distribution A1, A2. However other procedures are also possible and conceivable.

In the context of step S7 it should be noted that the integral of the determined presence probability distribution A must again give the value one over all the vascular locations 14. If this is not automatically the case, corresponding standardization takes place immediately in the context of step S7.

In step S8 the computer checks whether it has already determined the corresponding presence probability distribution A for the temporally last acquisition time t. If not, the computer returns to step S4. Otherwise the computer moves on to step S9, in which the computer executes further steps of the inventive method. In particular in the context of step S9 a visualization of the determined presence probability distributions A, in other words their temporal profile, can take place.

It is clear from the above that the computer determines the presence probability distributions A in temporally ascending order. It is also clear that with the embodiment according to FIG. 2 the computer determines the presence probability distributions A for all acquisition times t. The latter is not however essential. A determination could also be carried out for just some of the acquisition times t (for example just up to the nth acquisition time t or just for every second or third acquisition time t). It is also clear from the above that the presence probability distributions A with local three-dimensional resolution are related to the volume data set 11.

Possible embodiments of step S5 in FIG. 2 are described in more detail below in conjunction with FIGS. 5 to 7. The comments on FIGS. 5 to 7 here relate to a single acquisition time t.

Figure 5:
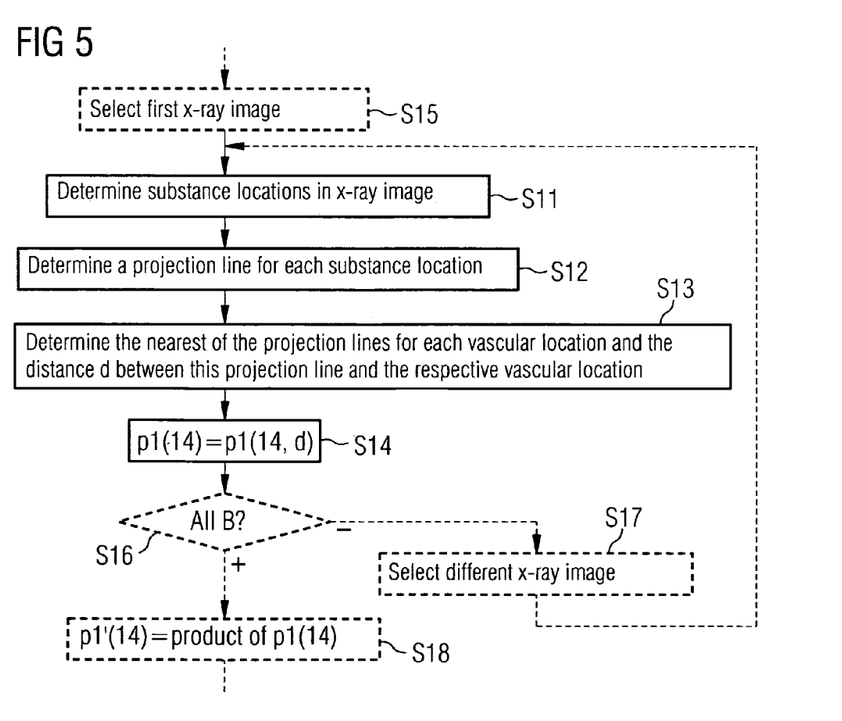
FIG. 5 shows a flow diagram.
Figure 6:
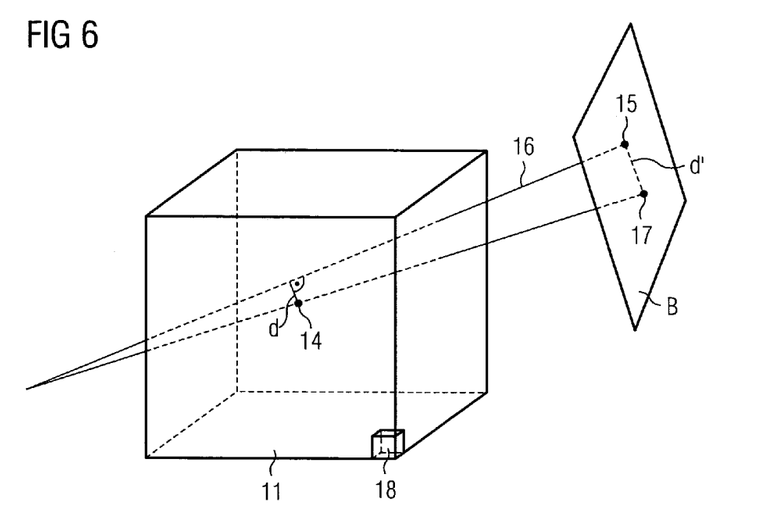
FIG. 6 shows a perspective view of a volume data set and an x-ray image and
FIGS. 7 to 9 show flow diagrams.

According to FIGS. 5 and 6 in a step S11 the computer determines locations 15 in a first x-ray image B of the selected group 12, which correspond to the presence of the substance in the vascular system 13. These locations 15 are hereafter referred to as substance locations.

In a step S12 the computer then determines a projection line 16 for each substance location 15 in the relevant x-ray image B. The projection line 16 corresponds to the locations of the volume data set 11, which are mapped onto the respective substance location 15.

To determine the projection line 16, the x-ray image B and the volume data set 11 have to be registered in relation to each other. Registration methods for x-ray images B in relation to volume data sets 11 are generally known to those skilled in the art. As such they are not described in the present invention. Rather correct registration (including its inaccuracies and possible error sources) is assumed in the context of the present invention.

In a step S13 the computer determines the next of the projection lines 16 for each vascular location 14 and their distance d from the respective vascular location 14.

In a step S14 the computer determines the respective first preliminary individual probability p1 for each vascular location 14 that the substance is present at the respective vascular location 14. The determination takes place as a function of the distance d determined in step S13. The computer assigns the determined first preliminary individual probability p1 to the respective vascular location 14.

Registration of the x-ray images B in relation to the volume data set 11 is, as mentioned above, generally subject to uncertainties. The computer therefore does not just assign a high first preliminary individual probability p1 to the vascular locations 14, if the next projection line 16 strikes the respective vascular location 14 (distance d=0). Rather it also assigns a high first preliminary individual probability p1 to the vascular location 14, if the distance d is relatively small. In other words: the computer sets the first preliminary individual probability p1 at a high value (above an upper limit probability), if the determined distance d is below a maximum distance. The maximum distance here is defined by the registration accuracy and registration uncertainties. If however the determined distance d exceeds the maximum distance, the computer sets the first preliminary individual probability p1 at a value below the upper limit probability. However this value too is at least as great as a lower limit probability, with the lower limit probability being greater than zero.

It is possible for the first preliminary individual probabilities p1 to be able to assume only two different values. However they preferably assume one of many possible values—of course as a function of the distance d. For example the first preliminary individual probability p1 can be ramped or stepped a number of times as a function of the distance d. It is preferably a bell-shaped curve, for example a Gaussian curve.

If the group 12 of x-ray images B comprises more than one x-ray image B, the steps S11 to S13 are executed for all the x-ray images B. In this instance step S14 is modified so that the first preliminary individual probability—now referred to as p1'—is determined as a function of the (i.e. all the) distances d between the nearest projection line 16 respectively for each x-ray image B and the respective vascular location 14. For example the first preliminary individual probability p1' can be determined as a function of the greatest of these distances d. However at present a different procedure is preferred, which is described in more detail below—likewise in conjunction with FIG. 5.

According to the currently preferred procedure further steps S15 to S18 are executed in addition to steps S11 to S14. However as steps S15 to S18 are only optional in conjunction with the principle of FIG. 5, they are shown with a broken line in FIG. 5.

In step S15 the computer selects for the respective group 12 of x-ray images B a first of the x-ray images B of said group 12. It then processes steps S11 to S14. The probability p1 determined in step S14 is hereafter referred to as image probability, so that it can be differentiated—purely linguistically—from the first preliminary individual probability p1' to be calculated later.

In step S16 the computer checks whether it has already determined the image probability p1 for all the x-ray images B of the respective group 12. If not, in a step S17 the computer selects a different x-ray image B from the group 12 and returns to step S11. As a result the computer therefore assigns one image probability p1 respectively to the vascular locations 14 for each x-ray image B considered based on the execution of steps S11 to S17.

In step S18 the computer forms the product of the image probabilities p1 for each vascular location 14. This product corresponds to the first preliminary individual probability p1' for the respective vascular location 14.

Figure 7:
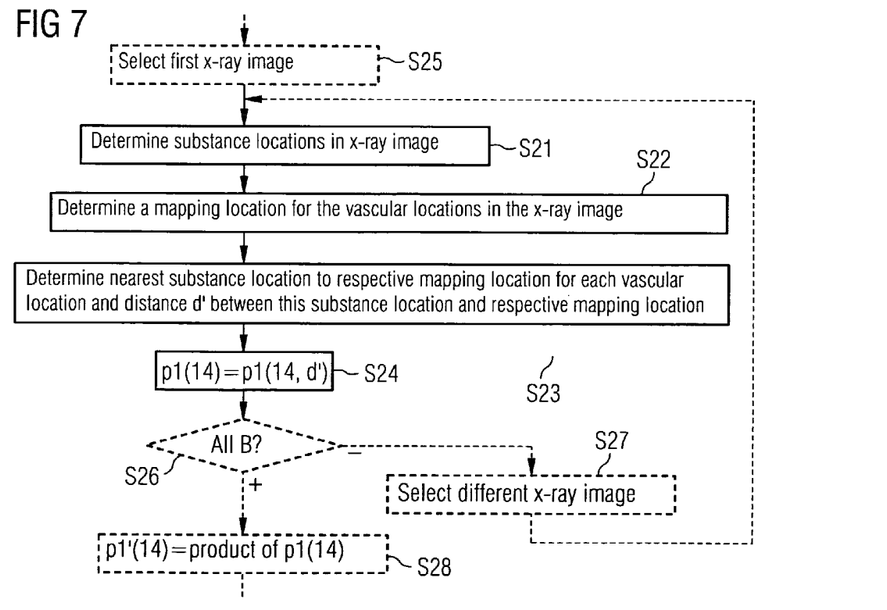

FIGS. 6 and 7 show an alternative to the procedure in FIGS. 5 and 6.

According to FIG. 7 in a step S21 the computer determines the substance locations 15 in an x-ray image B of the respective group. Step S21 corresponds to step S11 in FIG. 5.

In a step S22 the computer determines mapping locations 17 for the vascular locations 14, onto which mapping locations 17 the vascular locations 14 in the x-ray image B are mapped. In a step S23 the computer determines the nearest substance location 15 to the respective mapping location 17 for each vascular location 14 and the distance d' between this substance location 15 and the respective mapping location 17. Steps S22 and S23 correspond in a manner of speaking to the inverse process to steps S12 and S13 in FIG. 5.

In a step S24 the computer determines the first preliminary individual probability p1 for each vascular location 14. The determination takes place as a function of the distance d' determined in step S23. The computer assigns the determined first preliminary individual probability p1 to the respective vascular location 14. Step S24 corresponds to a similar process to step S14 in FIG. 5.

As in step S14 in FIG. 5 in step S24 the computer sets the first preliminary individual probability p1 assigned to the respective vascular location 14 at a value above an upper limit probability, if the distance d' is below a maximum distance. Otherwise the computer sets the first preliminary individual probability p1 at a value between the upper limit probability and a lower limit probability. As in step S14 in FIG. 5 the lower limit probability is smaller than the upper limit probability but greater than zero. The possibilities for determining the first preliminary individual probability p1 correspond to those in step S14 in FIG. 5.

If the groups 12 of x-ray images B respectively comprise more than one x-ray image B, steps S21 to S23 are executed for all the x-ray images B. In this instance step S24 is modified so that the first preliminary individual probability p1 is determined as a function of the (i.e. all the) distances d' between the mapping locations 17 and the respectively nearest substance locations 15. For example the first preliminary individual probability p1 can be determined as a function of the greatest of these distances d'. However a procedure similar to steps S15 to S18 in FIG. 5 is currently preferred. The corresponding steps (steps S25 to S28) are shown with a broken line in FIG. 7. They are shown broken, because steps S25 to S28 are only optional.

Modifications of the procedure in FIG. 2 are described below in conjunction with FIGS. 8 and 9. These modifications can be combined with the embodiments in FIGS. 5 to 7. Where individual steps in FIGS. 8 and 9 are not described in more detail, they correspond to those in FIG. 2.

Figure 8:
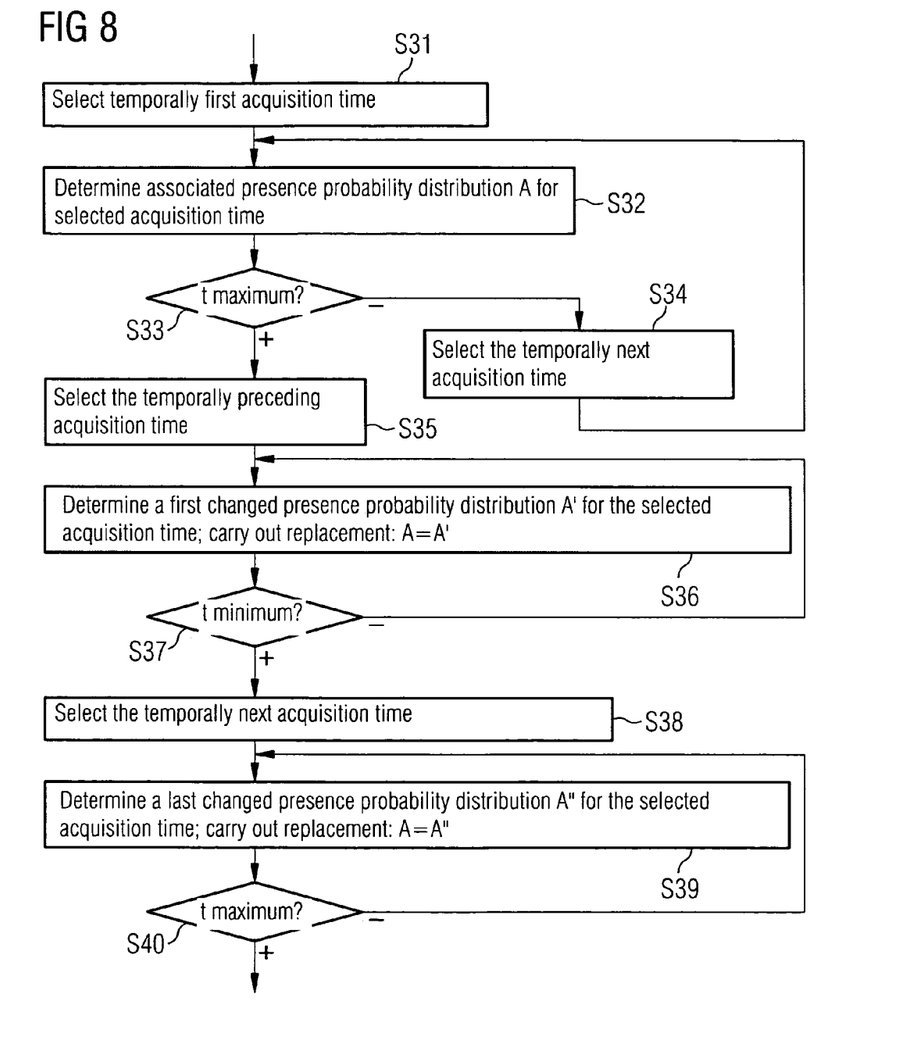
Figure 9:
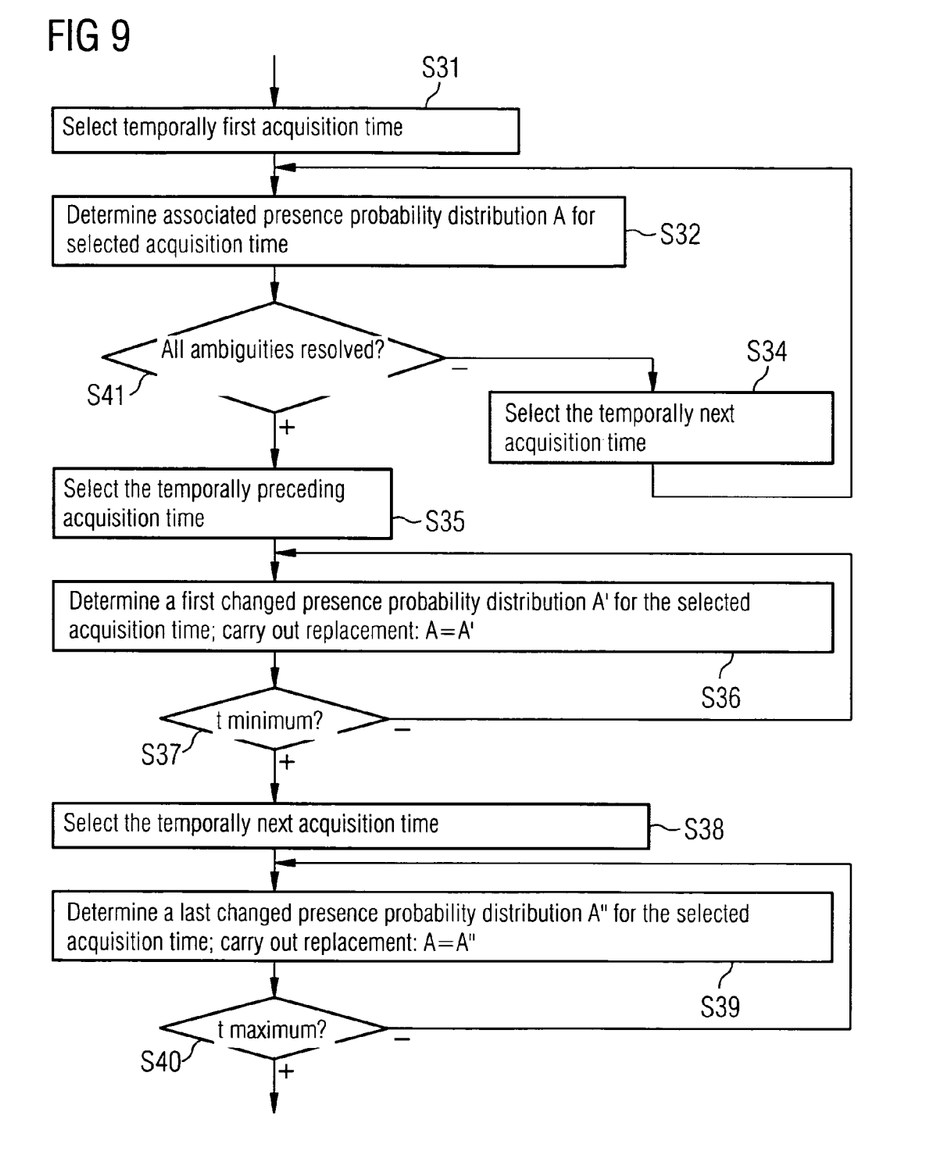

According to FIG. 8 in a step S31 the computer selects the temporally first acquisition time t. In a step S32 the computer determines the presence probability distribution A for the selected acquisition time t. In a step S33 the computer checks whether it has already determined the presence probability distribution A for all the acquisition times t. If not, in a step S34 the computer selects the temporally next acquisition time t and then returns to step S32. Thus steps S31 to S34 correspond to steps S2 to S8 in FIG. 2.

In a step S35 the computer selects the temporally immediately preceding acquisition time t starting from the currently selected acquisition time. In a step S36 the computer determines a first changed presence probability distribution A' for the now newly selected acquisition time t. In the context of step S36 it also replaces the presence probability distribution A determined in the context of step S32 with the newly determined presence probability distribution A', hereafter referred to as the first changed presence probability distribution A'.

Determination of the first changed presence probability distribution A' takes place based on the first preliminary presence probability distribution A1 and a second preliminary presence probability distribution A2'. Determination of the first preliminary presence probability distribution A1 is unchanged in relation to the procedure in FIG. 2. For this reason the reference character A1 is also retained for this presence probability distribution A1. If the first preliminary presence probability distribution A1, determined in the context of step S32, has been buffered, it does not have to be determined again but can be used directly. Determination of the second preliminary presence probability distribution A2' in step S36 is the inverse of the procedure in step S6 in FIG. 2. For in the context of step S36 the staring point is the presence probability distribution A, which was determined for the temporally next acquisition time t. With the exception of the temporally last acquisition time t, the presence probability distribution A used in the context of step S36 is thus already the first changed presence probability distribution A'.

The second preliminary presence probability distribution A2' is also determined in conjunction with a back-migration probability distribution w'. The back-migration probability distribution w' here is inverse to the migration probability distribution w, used in the context of step S32 (or step S6 in FIG. 2) for the corresponding pair of acquisition times t.

The further procedure of step S36—in particular the determination of the first changed presence probability distribution A' based on the first and second preliminary presence probability distributions A1, A2'—is similar to the procedure in step S7 in FIG. 2.

In a step S37 the computer checks whether it has already executed step S36 for the temporally first presence probability distribution A. If not, the computer returns to step S35.

In some instances it may be sufficient to terminate the method according to FIG. 8 here and to move on to step S9 (see FIG. 2). Generally however steps S38 to S40 are secondary to steps S31 to S37.

In step S38 the computer selects the temporally immediately following acquisition time t—in relation to the acquisition time t selected during the immediately preceding execution of step S38. In step S39 the computer determines a last changed presence probability distribution A" and replaces the previous—in some instances already first changed—presence probability distribution A, A' with the presence probability distribution A" determined in the context of step S39. Step S39 corresponds in its embodiment to steps S5 to S7 in FIG. 2. It must just be ensured that in the context of step S39 the current (in other words generally the last changed) presence probability distribution A" of the preceding acquisition time t is used.

In step S40 the computer checks whether it has already carried out step S39 for the temporally last presence probability distribution A. If not, the computer returns to step S38. Otherwise the computer moves on to step S9 (see FIG. 2).

The procedure in FIG. 9 corresponds essentially to the procedure in FIG. 8. The only difference is that in the context of FIG. 9 step S33 is replaced by a step S41. In step S41 the computer checks a different abort criterion from the one in step S33 in FIG. 8. It checks whether, by executing step S32 immediately before, it has been able to resolve with adequate certainty all the ambiguities resulting due to the fact that the group 12 of x-ray images B contains less location information. For example the abort criterion can be met, if it is sufficiently probable, based on the newly determined presence probability distribution A, that the substance has spread in the vascular system 13 from at least one feed point into the vascular system 13.

It is possible for criteria, with which the computer determines the first and second preliminary presence probability distributions A1, A2, A2' (for a defined volume data set 11 and sequence of groups 12 of x-ray images B), to be permanently predetermined for the computer. Alternatively it is possible for the computer to receive these criteria from the user 10. In the last-mentioned instance the computer can allow criteria to be predetermined for example only within permissible limits. One example of such criteria is a variant of a Gaussian curve, which is used to determine the first preliminary individual probabilities p1, p1' or the image probabilities p1. Alternatively the respective maximum distances, the above-mentioned high value and—in some instances stepped as a function of the distance d, d'—lower probability values can for example be predetermined.

The three-dimensional volume data set 11 contains a large number of volume data elements 18 (voxels 18). Determining the presence probability distributions A, A', A", A1, A2, A2' for all the voxels 18 of the volume data set 11 would therefore be very computation intensive. In a first step it is however possible without further ado to consider only the vascular locations 14 and to ignore the other voxels 18. This significantly reduces computation outlay.

It is even better if the computer determines the presence probability distributions (first preliminary, second preliminary, first determined, first changed and last changed) A, A', A", A1, A2, A2' and the migration probability distributions w, w' using at least one particle filter—generally a single particle filter.

Particle filters operate on particle sets. Each particle set contains a plurality of particles. The individual particles correspond in this instance to a random sample in each instance. Each particle consists of a state vector at time t and a weight G, which expresses the probability that at time t the respective particle will be present at a specific location (x, y, z). Further information can be assigned to the particles, for example quantity and direction of a speed, at which the respective particle moves. The particle sets correspond for each acquisition time t respectively to one of the presence probability distributions A, A', A", A1, A2, A2'. The particles are incremented for each time step using a suitable movement model (based on the migration probability distribution w or the back-migration probability distribution w') and evaluated under observation. Incrementation is based on the second preliminary presence probability distribution A2, A2'. The evaluation corresponds to the first preliminary presence probability distribution A1. Temporal propagation takes place in that the particles are transferred with a probability proportional to their weight G into the newly determined presence probability distribution A, A', A".

Particle filters are known as such to those skilled in the art. Reference is made for example to A. Doucet, N. de Freitas, N. Gordon, "Sequential Monte Carlo Methods in Practice", Springer-Verlag, 2001 and S. Arulampalam, S. Maskell, N. Gordon, "A Tutorial on Particle filters for On-line Nonlinear/Non-Gaussian Bayesian Tracking", IEEE Transactions on Signal Processing, vol. no. 2, pages 174 to 188, 2002.

The present invention offers many advantages, In particular the three-dimensional back projection of the angiography sequences is not only possible as such. Rather it is also possible, if individual angiograms or temporal segments of the overall sequence are disrupted, so that no information or only degraded information about blood flow can be obtained from these individual angiograms or temporal segments. Correct back projection into the volume data set 11 is also possible, if the projection direction, from which the sequence of groups 12 of x-ray images B was acquired, was not favorable. It is frequently possible, even if ambiguities cannot be eliminated with certainty due to vessel superimposition.

The above description serves solely to explain the present invention. The scope of protection of the present invention should however only be defined by the accompanying claims.

The invention claimed is:

1. A method for determining a presence probability distribution with local three-dimensional resolution for a substance in a vascular system of a patient, comprising:
   predetermining a volume data set and a temporal sequence of x-ray images of the vascular system;
   assigning acquisition times to the x-ray images showing a presence distribution with local two-dimensional resolution for the substance in the vascular system at the acquisition times;
   determining a first preliminary presence probability distribution for a first acquisition time based on the x-ray images assigned to the first acquisition time and the volume data set with the substance at a first vascular location;
   determining a second preliminary presence probability distribution for a second acquisition time based on the first preliminary probability distribution and a migration probability distribution with the substance migrating to a second vascular location at the second acquisition time; and
   assigning a high probability to the first and the second vascular locations if both the first and the second preliminary presence probability distributions have a high probability value or assigning a low probability to the first or the second vascular location if the respective first or the second preliminary presence probability distribution has a low but greater than zero probability value.

2. The method as claimed in claim 1, wherein the presence probability distribution is determined by multiplying the first and the second preliminary presence probability distributions.

3. The method as claimed in claim 1, wherein the first preliminary presence probability distribution is determined by steps comprising:
   locating substance locations in the vascular system in the x-ray images;
   defining projection lines in the volume data set for the substance locations;
   selecting nearest projection lines from the projection lines for vascular locations in the x-ray images;
   calculating distances between the nearest projection lines and the vascular locations; and
   determining the first preliminary presence probability distribution as a function of the distances.

4. The method as claimed in claim 3,
   wherein the first preliminary presence probability distribution is above an upper limit probability if the greatest of the distances is below a maximum distance, or
   wherein the first preliminary presence probability distribution is between a lower limit probability that is greater than zero and the upper limit probability.

5. The method as claimed in claim 1, wherein the first preliminary presence probability distribution is determined by steps comprising:
   locating substance locations in the vascular system in the x-ray images;
   selecting nearest substance locations from the substance locations for vascular locations in the x-ray images;
   defining mapping locations for the vascular locations in the x-ray images;
   calculating distances between the mapping locations and the nearest substance locations; and
   determining the first preliminary presence probability distribution as a function of the distances.

6. The method as claimed in claim 5,
   wherein the first preliminary presence probability distribution is above an upper limit probability if the greatest of the distances is below a maximum distance, or
   wherein the first preliminary presence probability distribution is between a lower limit probability that is greater than zero and the upper limit probability.

7. The method as claimed in claim 1, wherein the first and the second preliminary presence probability distributions are determined based on a criteria that is received from a user or is permanently predetermined.

8. The method as claimed in claim 1, wherein the presence probability distribution for the first acquisition time is determined based on the x-ray images assigned to the first acquisition time and the volume data set.

9. The method as claimed in claim 1, wherein the presence probability distribution and the migration probability distribution are determined by a particle filter.

10. The method as claimed in claim 1, further comprising:
    checking whether an abort criterion has been met when determining the presence probability distribution;
    replacing the presence probability distribution starting from a last determined presence probability distribution with a first changed presence probability distribution until a presence probability distribution of the first acquisition time has been replaced if the abort criterion is met; and
    determining the first changed presence probability distribution based on the first preliminary presence probability distribution, a next presence probability distribution assigned to a next acquisition time, and a back-migration probability distribution that is an inverse to the migration probability distribution.

11. The method as claimed in claim 10, further comprising:

replacing the next presence probability distribution starting from the presence probability distribution of the first acquisition time with a last changed presence probability distribution until the presence probability distribution has been replaced if the abort criterion is met; and determining the last changed presence probability distribution based on the first preliminary presence probability distribution, a preceding presence probability distribution assigned to a preceding acquisition time, and the migration probability distribution.

12. The method as claimed in claim 11, wherein the abort criterion is determined based on a presence probability distribution for a last acquisition time or after an ambiguity resulting from less location information in the x-ray images than the volume data set is resolved.

13. The method as claimed in claim 12, wherein the presence probability distributions is determined based on the first preliminary presence probability distribution, the preceding presence probability distribution last assigned to the preceding acquisition time, and the migration probability distribution if the abort criterion is met and the presence probability distribution is not assigned to the last acquisition time.

14. A computer computer-readable-medium storing a program for determining a presence probability distribution with local three-dimensional resolution for a substance in a vascular system of a patient, comprising:

a subroutine that:

assigns acquisition times to the x-ray images showing a presence distribution with local two-dimensional resolution for the substance in the vascular system at the acquisition times;

determines a first preliminary presence probability distribution for a first acquisition time based on the x-ray images assigned to the first acquisition time and a volume data set of the vascular system with the substance at a first vascular location;

determines a second preliminary presence probability distribution for a second acquisition time based on the first preliminary probability distribution and a migration probability distribution with the substance migrating to a second vascular location at the second acquisition time; and assigns a high probability to the first and the second vascular locations if both the first and the second preliminary presence probability distributions have a high probability value or assigning a low probability to the first or the second vascular location if the respective first or the second preliminary presence probability distribution has a low but greater than zero probability value.

15. The computer program as claimed in claim 14, wherein the presence probability distribution is determined by multiplying the first and the second preliminary presence probability distributions.

* * * * *